(12) United States Patent
Okuyama et al.

(10) Patent No.: US 6,310,728 B1
(45) Date of Patent: *Oct. 30, 2001

(54) IMAGE VIEWING APPARATUS

(75) Inventors: Atsushi Okuyama, Tokorozawa; Junko Kuramochi, Ninomiya-machi, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/335,490

(22) Filed: Jun. 18, 1999

(30) Foreign Application Priority Data

| Jun. 19, 1998 | (JP) | .................................. | 10-189919 |
| Jun. 16, 1999 | (JP) | .................................. | 11-169600 |

(51) Int. Cl.⁷ ............................. G02B 27/14; G09G 5/00
(52) U.S. Cl. ................................. 359/633; 359/631; 345/8
(58) Field of Search .................. 359/630, 631, 632, 633, 634, 636; 345/8; 353/28

(56) References Cited

U.S. PATENT DOCUMENTS

| Re. 27,356 | 5/1972 | La Russa | .............................. 359/634 |
| 3,940,204 | 2/1976 | Withrington | .......................... 359/636 |

(List continued on next page.)

FOREIGN PATENT DOCUMENTS

| 0 380 035 | 8/1990 | (EP) | .............................. G02B/17/06 |
| 0 408 344 | 1/1991 | (EP) | .............................. A42B/3/00 |
| 0 556 598 | 8/1993 | (EP) | .............................. G02B/7/34 |
| 0 583 116 | 2/1994 | (EP) | .............................. G02B/27/00 |
| 0 618 471 | 10/1994 | (EP) | .............................. G02B/27/00 |
| 1 578 136 | 11/1980 | (GB) | .............................. G01C/1/00 |
| 2 246 900 | 2/1992 | (GB) | .............................. G09F/19/18 |
| 57-40201 | 3/1982 | (JP) | .............................. G02B/5/04 |
| 58-78116 | 5/1983 | (JP) | .............................. G02B/27/02 |
| 61-31290 | 9/1986 | (JP) | .............................. B41M/5/26 |
| 62-214782 | 9/1987 | (JP) | .............................. H04N/5/64 |
| 1-274736 | 11/1989 | (JP) | .............................. A61B/3/10 |
| 2-297516 | 12/1990 | (JP) | .............................. G02B/27/02 |

(List continued on next page.)

OTHER PUBLICATIONS

"Development of Super Compact HMD with Sight Line Input", S. Yamazaki et al., Proceedings of 3D Image Conference '95, Jul. 6 and 7, 1995 (and translation), p pp. 70–75.

Primary Examiner—Georgia Epps
Assistant Examiner—David N. Spector
(74) Attorney, Agent, or Firm—Fitzpatrick, Cella, Harper & Scinto

(57) ABSTRACT

An image viewing apparatus has a stop for limiting light from an original image, and a viewing optical system for guiding the light from the original image, limited by the stop, to the eye of a viewer. The viewing optical system has a prism body including an entrance surface into which the light from the original image is incident, a reflecting surface for reflecting the incident light, and an exit surface from which the reflected light emerges. At least one of the entrance surface, reflecting surface, and exit surface is a curved surface, which is a rotationally asymmetric, aspherical surface. The apparatus satisfies the following condition:

$$3.5 < Epy/Ly$$

where a reference optical axis is defined by a ray emitted from the center of the original image and passing the center of the pupil of the viewer via the viewing optical system, Ly is a width of the original image, and Epy is a distance from the optical element to an intersecting point (on the viewer side) of two rays emitted from two edges of the original image in the extending direction of the intersecting line.

8 Claims, 5 Drawing Sheets

U.S. PATENT DOCUMENTS

| | | |
|---|---|---|
| 4,026,641 | 5/1977 | Bosserman et al. .................. 359/634 |
| 4,081,209 | 3/1978 | Heller et al. ........................... 359/630 |
| 4,383,740 | 5/1983 | Bordovsky ............................ 359/726 |
| 4,563,061 | 1/1986 | Ellis ...................................... 359/630 |
| 4,669,810 | 6/1987 | Wood .................................... 359/634 |
| 4,775,217 | 10/1988 | Ellis ...................................... 359/634 |
| 4,854,688 | 8/1989 | Hayford et al. ...................... 359/630 |
| 4,859,030 | 8/1989 | Rotier ................................... 359/630 |
| 4,874,214 | 10/1989 | Cheysson et al. ................... 359/638 |
| 4,962,313 | 10/1990 | Rose ..................................... 250/311 |
| 4,969,724 | 11/1990 | Ellis ...................................... 250/311 |
| 5,000,544 | 3/1991 | Staveley ............................... 359/630 |
| 5,006,072 | 4/1991 | Letovsky et al. ....................... 434/61 |
| 5,093,567 | 3/1992 | Staveley ............................... 250/221 |
| 5,121,099 | 6/1992 | Hegg et al. ........................... 250/221 |
| 5,189,452 | 2/1993 | Hodson et al. ....................... 307/520 |
| 5,319,207 | 6/1994 | Rose et al. ........................ 250/396 R |
| 5,327,191 | 7/1994 | Shindo et al. ........................ 354/402 |
| 5,357,372 | 10/1994 | Chen et al. ........................... 359/637 |
| 5,384,654 | 1/1995 | Iba ........................................ 359/634 |
| 5,416,876 | 5/1995 | Ansley .................................. 385/116 |
| 5,430,634 | 7/1995 | Baker et al. ............................ 362/32 |
| 5,436,763 | 7/1995 | Chen et al. ........................... 359/565 |
| 5,436,765 | 7/1995 | Togino ................................. 359/631 |
| 5,459,612 | 10/1995 | Ingleton ............................... 359/630 |
| 5,479,224 | 12/1995 | Yasugaki .............................. 353/101 |
| 5,483,307 | 1/1996 | Anderson ............................... 353/28 |
| 5,486,841 | 1/1996 | Hara et al. ............................... 345/8 |
| 5,506,728 | 4/1996 | Edwards et al. ..................... 359/629 |
| 5,513,041 | 4/1996 | Togino ................................. 359/631 |
| 5,517,366 | 5/1996 | Togino ................................. 359/850 |
| 5,530,586 | 6/1996 | Yasugaki .............................. 359/364 |
| 5,539,422 | 7/1996 | Heacock et al. ......................... 345/8 |
| 5,539,578 | 7/1996 | Togino et al. ........................ 359/630 |
| 5,543,968 | 8/1996 | Freeman et al. ..................... 359/631 |
| 5,546,227 * | 8/1996 | Yasugaki et al. .................... 359/630 |
| 5,594,588 | 1/1997 | Togino ................................. 359/631 |
| 5,598,248 | 1/1997 | Nagano et al. ...................... 359/630 |
| 5,640,275 | 6/1997 | Bourguignat et al. ............... 396/382 |
| 5,640,632 | 6/1997 | Kayama et al. ...................... 359/630 |
| 5,646,783 | 7/1997 | Banbury ............................... 359/631 |
| 5,663,833 | 9/1997 | Nanba et al. ......................... 359/631 |
| 5,671,062 | 9/1997 | Nakamura ............................ 359/687 |
| 5,689,736 | 11/1997 | Okuyama et al. ...................... 396/51 |
| 5,699,136 | 12/1997 | Arakawa et al. ..................... 349/118 |
| 5,701,202 | 12/1997 | Takahashi ............................ 359/631 |
| 5,706,136 | 1/1998 | Okuyama et al. ................... 359/630 |
| 5,714,967 | 2/1998 | Okamura et al. ........................ 345/8 |
| 5,726,807 | 3/1998 | Nakaoka et al. ..................... 359/631 |
| 5,734,505 | 3/1998 | Togino et al. ........................ 359/631 |
| 5,737,113 | 4/1998 | Kuramochi et al. ................. 359/259 |
| 5,739,797 | 4/1998 | Karasawa et al. ....................... 345/8 |
| 5,768,024 | 6/1998 | Takahashi ............................ 359/631 |
| 5,768,025 | 6/1998 | Togino et al. ........................ 359/633 |
| 5,774,096 | 6/1998 | Usuki et al. ............................. 345/8 |
| 5,815,741 | 9/1998 | Okuyama et al. ...................... 396/51 |
| 5,836,667 | 11/1998 | Baker et al. ............................ 362/32 |
| 5,857,017 | 6/1999 | Ohi et al. .............................. 379/157 |
| 5,875,056 | 2/1999 | Takahashi ............................ 359/633 |

FOREIGN PATENT DOCUMENTS

| | | | |
|---|---|---|---|
| 3-11492 | 1/1991 | (JP) | ................. G07F/7/08 |
| 3-101709 | 4/1991 | (JP) | ............... G02B/27/02 |
| 3-109029 | 5/1991 | (JP) | ................. G02B/7/28 |
| 3-180810 | 8/1991 | (JP) | ............... G02B/17/08 |
| 4-242630 | 8/1992 | (JP) | ............... G02B/27/02 |
| 4-343313 | 11/1992 | (JP) | ............... G02B/27/02 |
| 6-43389 | 2/1993 | (JP) | ............... G02B/27/02 |
| 5-303054 | 11/1993 | (JP) | ............... G02B/15/16 |
| 5-303055 | 11/1993 | (JP) | ............... G02B/27/02 |
| 5-303056 | 11/1993 | (JP) | ............... G02B/27/02 |
| 5-323229 | 12/1993 | (JP) | ............... G02B/27/02 |
| 6-214116 | 8/1994 | (JP) | ................. G02B/5/30 |
| 7-333551 | 12/1995 | (JP) | ............... G02B/27/02 |
| 8-50256 | 2/1996 | (JP) | ............... G02B/27/02 |
| 8-160340 | 6/1996 | (JP) | ............... G02B/27/02 |
| 8-179238 | 7/1996 | (JP) | ............... G02B/27/02 |

* cited by examiner

IMAGE VIEWING APPARATUS

BACKGROUND OF THE INVENTION

1. Field of the Invention

The present invention relates to an image viewing apparatus and, more particularly, to the image viewing apparatus suitably applicable to an image viewing system such as a viewfinder of a camera, a so-called head-mounted display, a goggle type display, or the like and to an image pickup device such as a camera.

2. Related Background Art

Downsizing of the whole apparatus has been demanded for image viewing apparatuses such as the head-mounted displays (HMDs), goggle type displays, etc. A variety of optical systems for meeting this demand have been suggested heretofore.

Applicant of the present application suggested in Japanese Laid-open Patent Application No. 7-333551, No. 8-50256, No. 8-160340, and No. 8-179238 the image viewing apparatus using an LCD (liquid crystal display) as display means for displaying image information and a small prism as a viewing optical system while achieving the downsizing of the whole apparatus.

The above applications describe that light emitted from the LCD displaying the image information is made incident into the small prism and then is guided via a refracting surface and a total reflection surface having curvature, formed in the small prism, and then via a reflecting surface out of the small prism toward a viewer. This causes an enlarged virtual image of the image information displayed on the display means (LCD) to be formed ahead of the viewer, whereby the viewer can view the virtual image.

In an image viewing apparatus such as an HMD etc., it is a significant challenge to decrease the overall size and weight of apparatus, because the apparatus is mounted on the head part of viewer. Another important challenge is to broaden the viewing angle in order to provide the viewing of the image information displayed on the display means with strong appeal.

SUMMARY OF THE INVENTION

An object of the present invention is, therefore, to provide an image viewing apparatus that permits the viewing of image information in a wide viewing field and with good image quality while achieving the downsizing of the whole apparatus, by properly setting the structure of an optical system for guiding light from the display means to the eye of the viewer, e.g. an optical element or the like comprised of a prism body having the refracting action, on the occasion of the image information viewing the image information displayed on the display means, such as a liquid crystal display or the like, in the wide viewing field.

In order to accomplish the above object, the image viewing apparatus of the present invention is characterized by comprising the following constituent elements:

a stop for limiting light from an original image; and a viewing optical system for guiding the light from the original image, limited by the stop, to the eye of a viewer, said viewing optical system having an optical element of a transparent optical material, wherein said optical element comprises an entrance surface into which the light from said original image is incident, a reflecting surface for reflecting the light incident into the entrance surface, and an exit surface from which the light reflected by the reflecting surface is emergent and wherein at least one of the entrance surface, reflecting surface, and exit surface is a curved surface, the curved surface being a rotationally asymmetric, aspherical surface.

When a reference optical axis is defined by a ray emitted from the center of the original image and passing the center of the pupil of the viewer via the viewing optical system, the image viewing apparatus of the present invention further satisfies at least one of the following conditions (a) to (d):

$$3.5 < Epy/Ly \tag{a}$$

where Ly is a width of the original image in an extending direction of an intersecting line between a plane including the reference optical axis, and the original image, and Epy is a distance from an intersecting point on the viewer side, of two rays emitted from two edges of the original image in the extending direction of the intersecting line, passing edges of an aperture of the stop corresponding to the respective edges of the image, and passing through the viewing optical system, to the optical element;

$$1 < Epx/Epy \tag{b}$$

where Epy is a distance to the optical element from an intersecting point on the viewer side, of two rays emitted from two edges of the original image in an extending direction of an intersecting line between a plane including the reference optical axis, and the original image, passing edges of an aperture of the stop corresponding to the respective edges of the image, and passing through the viewing optical system, and Epx is a distance to the optical element from an intersecting point on the viewer side, of two rays emitted from two edges of the original image in a direction perpendicular to the intersecting line, passing edges of the aperture of the stop corresponding to the respective edges of the image, and passing through the viewing optical system;

$$23° < \alpha h \tag{C}$$

where $\alpha h$ is an angle at an intersection on the viewer side between two rays emitted from two edges of the original image in a direction perpendicular to an intersecting line between a plane including the reference optical axis, and the original image, passing edges of an aperture of the stop corresponding to the respective edges of the image, and passing through the viewing optical system;

$$D(\tan^2 \alpha y)/Ly^2 < 1/1000 \tag{d}$$

where $$\alpha y = (\alpha u - \alpha b)/2,$$

where Ly is a width of the original image in an extending direction of an intersecting line between a plane including the reference optical axis, and the original image, $\alpha u$ is an angle at an intersection on the viewer side between a ray emitted from one edge of the original image in the extending direction of said intersecting line, passing an edge of the aperture of the stop corresponding thereto, and passing through the viewing optical system, and the reference optical axis, $\alpha b$ is an angle at an intersection on the viewer side between a ray emitted from another edge of the original image in the extending direction of the intersecting line and passing an edge of the aperture of the stop corresponding thereto, and the reference optical axis, and D is an air-reduced amount between the stop and the original image.

In another aspect, the image viewing apparatus of the present invention is also characterized by comprising the following:

a liquid crystal display device, the liquid crystal display device comprising a liquid crystal element for changing a polarization property of light incident thereto and emitting the incident light with the changed polarization property, a light source for illuminating the liquid crystal element, and a viewing angle improving element for substantially equalizing polarization properties of the liquid crystal element varying according to angles of incidence of the illumination light; and a viewing optical system for guiding light from the liquid crystal display device to the eye of a viewer, the viewing optical system comprising an optical element of a transparent optical material, wherein the optical element comprises an entrance surface into which the light from the liquid crystal display device is incident, a reflecting surface for reflecting the light incident into the entrance surface, and an exit surface from which the light reflected by the reflecting surface is emergent and wherein at least one of the entrance surface, reflecting surface, and exit surface is a curved surface, the curved surface being a rotationally asymmetric, aspherical surface.

DETAILED DESCRIPTION OF THE PREFERRED EMBODIMENTS

Figure 1:
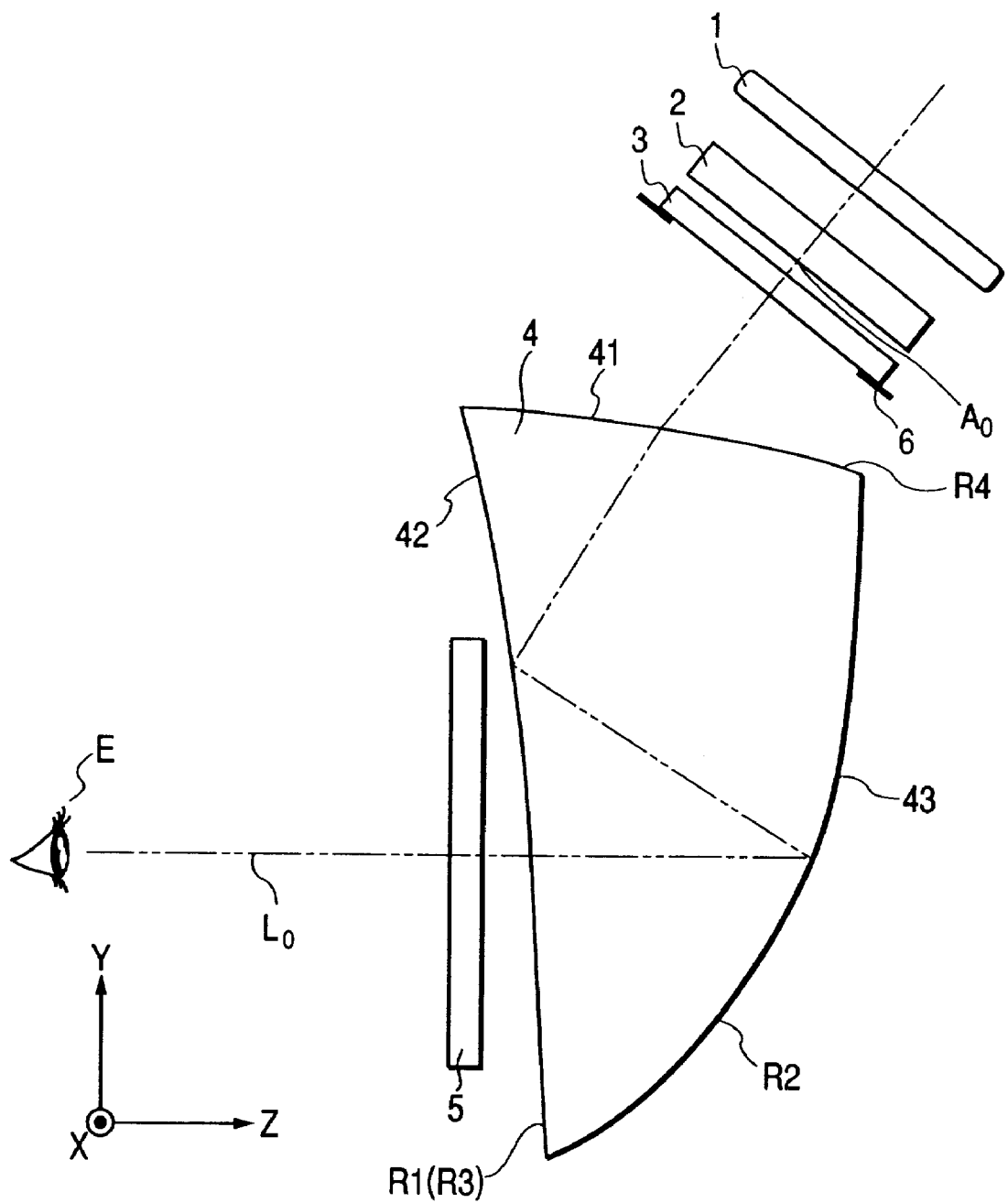
FIG. 1 is a sectional view of the major part of the image viewing apparatus in Embodiment 1 of the present invention.
Figure 2:
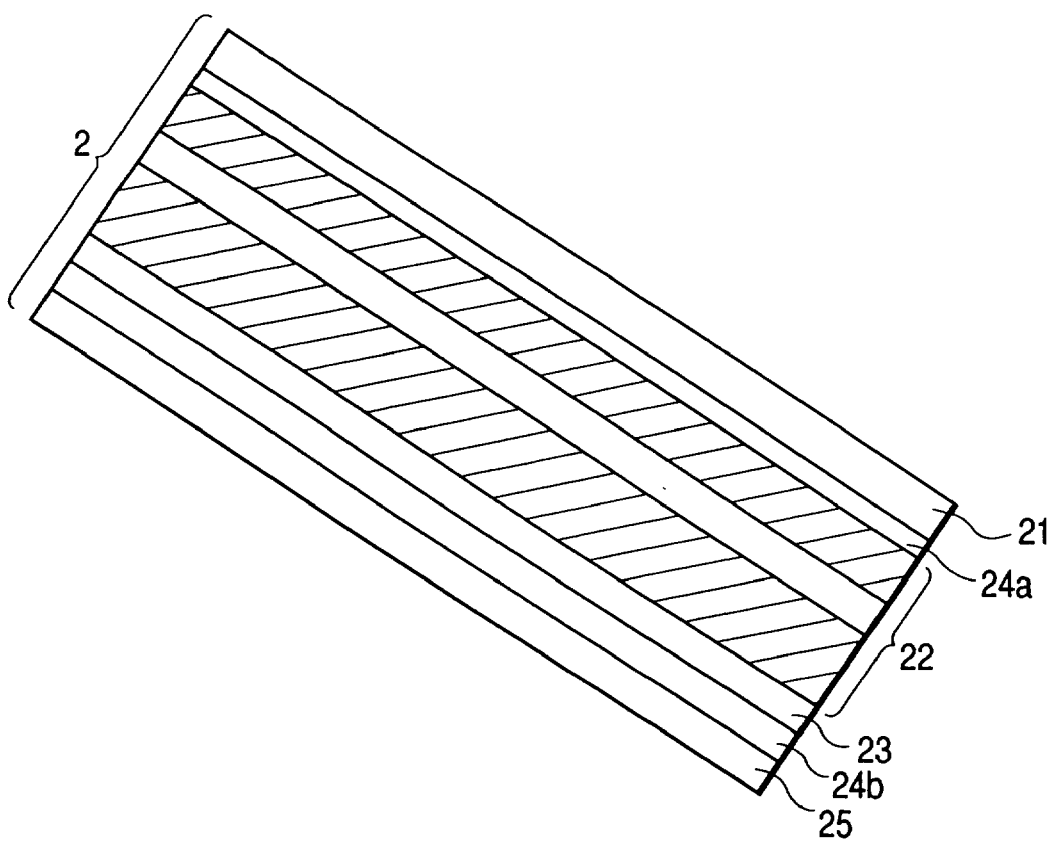
FIG. 2 is an explanatory diagram of liquid crystal display device 2 of FIG. 1.

FIG. 1 is a sectional view of the major part of Embodiment 1 of the image viewing apparatus according to the present invention. In FIG. 1, reference numeral 1 designates a back light (light source) such as a fluorescent lamp or the like for illuminating a liquid crystal panel. Numeral 2 denotes a liquid crystal display device, an enlarged sectional view of which is shown in FIG. 2. The liquid crystal display device 2 is composed of, as illustrated in FIG. 2, a polarizer 21 such as a polarizing plate or the like for polarizing the illumination light into predetermined polarized light, a liquid crystal element 22 for displaying an image while modulating the polarization direction (or changing polarization characteristics) by a pixel array of a matrix pattern, a color filter 23 for changing light from each pixel of the liquid crystal element 22 into a color beam of R, G, or B, first and second viewing angle improving elements 24a, 24b for effecting correction by substantially equalizing the polarization characteristics varying according to incident angles of the illumination light incident to the liquid crystal element 22, and an analyzer 25 such as a polarizing plate or the like for intercepting non-display light.

In FIG. 1, numeral 3 indicates a diffraction type low-pass filter for broadening the display light into non-transmissive portions called a black matrix between pixels by diffracting the light from each pixel of the liquid crystal element 22 of the liquid crystal display device 2. Numeral 4 represents a prism body (prism lens) having optical action surfaces comprised of three free curved surfaces 41, 42, 43. The free curved surface 41 is a first optical action surface (entrance surface), the free curved surface 42 is a second optical action surface (total reflection surface; exit surface), and the free curved surface 43 is a third optical action surface (concave mirror). Here, the "free curved surfaces" means aspherical surfaces being rotationally asymmetric (or having no symmetry axis). In the present embodiment, the free curved surfaces 41, 42, 43 are of a shape symmetric only with respect to one plane (YZ plane) parallel to the plane of the drawing.

Numeral 5 is a protecting element comprised of a parallel plane plate of acrylic resin for protecting the prism body 4 from external impact. Numeral 6 denotes a field stop for limiting the light from the liquid crystal element 22 of the liquid crystal display device 2.

In the present embodiment the viewing angle improving elements 24a, 24b work to set the exit angle of rays from the liquid crystal element 22 to the eye E of the viewer in a wide range in the liquid crystal element 22. In addition, by combining the free curved surfaces with the viewing optical system, the viewing system can be constructed in the compact size but with high performance. Lo indicates a reference optical axis, which is defined by a ray emitted from the center Ao of an image display area A of the liquid crystal element 22, described hereinafter, and passing the center of the pupil of the viewer's eye E.

The light from the liquid crystal display device 2 travels through the low-pass filter 3 and stop 6 into the first optical action surface 41 of the prism body 4 and then is incident at an angle over the critical angle to the second optical action surface 42 to be totally reflected by the surface 42. Then the light is reflected by the third optical action surface 43 and finally is incident at an angle below the critical angle again to the second optical action surface 42 to be transmitted thereby.

The light from the liquid crystal display device 2, entering the prism body 4, is subject to reflection and refraction in this way and thereafter is guided out of the prism body 4 to the eye E.

In the present embodiment decentering aberration is suppressed to a low level by using the free curved surfaces as the three surfaces, the first to third optical action surfaces 41 to 43, of the prism body 4.

The viewing angle improving elements 24a, 24b in the present embodiment are called "optical compensating films" or "viewing angle compensating films", which compensate for the angles of polarization before and after the liquid crystal layer (liquid crystal element) so as to align torsional angles of different polarization states depending upon incident angles, as disclosed, for example, in Japanese Laid-open Patent Application No. 6-214116 (corresponding to U.S. Pat. No. 5,669,136) or the like.

In FIG. 2 the liquid crystal element 22 is constructed by interposing the liquid crystal layer between opposed substrates. Further, a substrate of glass or the like may also be provided between the elements composing the display device 2.

Figure 3:
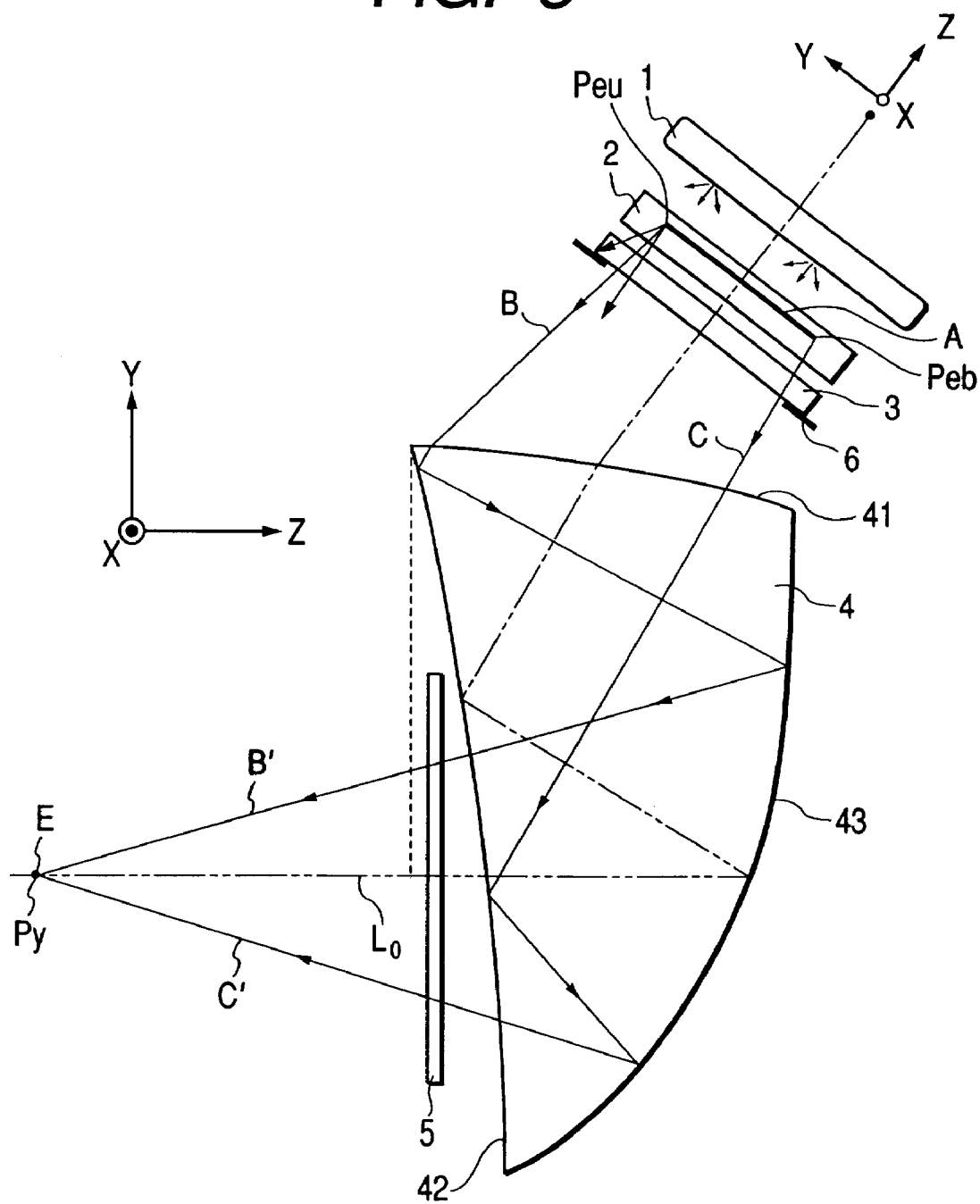
FIG. 3 is an explanatory diagram to show optical paths of rays emitted from edges of an image display area A.

Next described referring to FIG. 3 is the relationship among the liquid crystal element 22, the field stop 6, and a visual field limit point. The light from the liquid crystal element 22 is emitted at a spread angle equal to that of the illumination light from the back light 1, out of the whole area (image display area) A displaying an image as an original image.

Here, noting light emerging from one edge Peu of the image display area A, its transmission range is limited by the field stop 6 before it enters the prism body 4. The light outside a ray B is intercepted. This ray B becomes a ray B' by ray tracing up to the viewer's eye E.

Similarly, light emerging from the other edge Peb opposite to the edge Peu is limited by the field stop 6 so that rays outside a ray C are intercepted. The ray C becomes a ray C' on the viewer's eye E side. When one views the field in the directions along the respective rays from the position of an intersecting point Py of the ray B' and the ray C' with the reference optical axis Lo, the edges Peu, Peb of the image display area A are overlaid on the corresponding edges of the field stop 6.

If the viewing point is at a position distant from this intersecting point Py the edges of the field stop 6 will be placed inside the image display area A, so that the viewer cannot view the whole image display area A. For this reason, the intersecting point Py will be called a field limit point. When the rotational center of the eye E is placed at the field limit point, the viewer can view the whole screen at the most distant point from the viewing optical system and thus the field limit point indicates visibility of image according to the eye point.

In FIG. 3, the Z-direction (Z-axis) is taken along the reference optical axis Lo, the Y-direction (Y-axis) along a direction perpendicular to the Z-direction in the plane of the drawing, and the X-direction (X-axis) along a direction perpendicular to both the Z-direction and Y-direction. However, on the image display area A, the Y-direction is taken along a vertical direction (an extending direction of an intersecting line between the plane including the reference optical axis, and the image display area A, and the X-direction along a horizontal direction (a direction perpendicular to the intersecting line between the plane including the reference optical axis, and the image display area A).

Numerical examples will be presented below. The following numerical examples are expressed in the following way: the origin is set at a point Qo at which an arbitrarily set reference plane (plane Q) provided for specifying the position of each optical action surface forming the prism body 4 intersects with the reference optical axis Lo, the origin of a local coordinate system of each surface is expressed by decentering amounts and a tilt amount from the set reference origin Qo, and the shape of each surface is expressed using the local coordinate system. The free curved surfaces expressed by their local coordinate system are represented by an aspherical formula defined by the following equation.

$$Z = \frac{C\rho^2}{1+\sqrt{1-C^2\rho^2}}$$

$+C_4 \cdot \rho^2 \cos 2\theta + C_5(2\rho^2-1) + C_9(3\rho^3-2\rho)\sin\theta$ $+C_{10}\rho^3 \sin 3\theta + C_{11}\rho^4 \cos 4\theta + C_{12}(4\rho^4-3\rho^2)\cos 2\theta$ $+C_{13}(6\rho^4-6\rho^2+1) + C_{19}(10\rho^5-12\rho^3+3\rho)\sin\theta$ $+C_{20}(5\rho^5-4\rho^3)\sin 3\theta + C_{12}\rho^5 \sin 5\theta$ $+C_{22}\rho^6 \cos 6\theta + C_{23}(6\rho^6-5\rho^4)\cos 4\theta$ $+C_{25}(20\rho^6-30\rho^4+12\rho^2-1)$ where $\rho^2 = X^2+Y^2$ $\cos\theta = X/\rho$ $\sin\theta = Y/\rho$ $C = 1/r$ The coordinate system on the set reference plane is defined as follows; the Z-axis is taken along the direction in which the viewer E views the screen center Ao, the Y-axis along a vertical direction with respect to the viewer (the direction of the plane of the lens cross section), and the X-axis along the direction perpendicular to the Z-axis and the Y-axis.

A movement amount of the relative coordinate origin of each surface in the Z-axis direction with respect to the set reference origin Qo is indicated by dZ, a movement amount thereof in the Y-axis direction by dY, and an angle between the Z-axis of the relative coordinate system and the Z-axis of the set reference coordinate system by Tilt which is a positive angle if counterclockwise in the plane of FIG. 3. In all the numerical examples, a movement amount dX in the X-axis direction with respect to the set reference origin Qo is 0. The direction of the X-axis of each relative coordinate system is coincident with the direction of the X-axis of the set reference coordinate system. An order to each surface is a number counted when the rays are traced backward from the eye E side.

However, the surfaces forming the diffraction type low-pass filter 3 and the liquid crystal display device 2 are indicated by absolute coordinates with respect to a surface S (the fifth surface) closest to the prism lens 4 with the origin of the local coordinate system at a point where the reference optical axis passes on the surface S, the surfaces from the surface S to the image display surface are perpendicular to the normal direction to the surface S, and data presents the spacing and refractive index of each surface.

In the numerical examples, R1 represents the second optical action surface being the exit surface, R2 the third optical action surface being the concave mirror, R3 the second optical action surface being the total reflection surface, and R4 the first optical action surface being the entrance surface, wherein R1 to R4 are the surfaces forming the prism body. Further, R5, R6 represent the surfaces forming the low-pass filter, R7, R8 represent the surfaces of the liquid crystal display device 2 where the polarizer 25, viewing angle improving elements 24a, 24b, and color filter 23 are regarded as one glass block, and R9 represents the image display surface of the liquid crystal element 22.

Numerical Example 1

Index of prism lens n: 1.57, Abbe number ν: 33.8

| Surface No. | | | | | | |
|---|---|---|---|---|---|---|
| R1 | dY | −59.41 | dZ | 35.27 | Tilt | −4.71 |
| r: | −422.096 | | | | | |
| | c4: | −5.343e−04 | c5: | −3.223e−04 | c9: | −2.774e−07 |
| | c10: | −1.048e−06 | c11: | 1.571e−08 | c12: | 2.179e−09 |
| | c13: | −2.544e−09 | c19: | −2.343e−11 | c20: | 1.393e−11 |
| | c21: | 2.420e−10 | c22: | −5.169e−12 | c23: | 8.830e−15 |
| | c24: | 1.410e−13 | c25: | −2.187e−13 | | |
| R2 | dY | −4.50 | dZ | 41.92 | Tilt | −25.29 |
| r: | −67.410 | | | | | |

-continued

| | | | | | | |
|---|---|---|---|---|---|---|
| | c4: | −9.876e−04 | c5: | −8.327e−04 | c9: | −7.984e−07 |
| | c10: | −1.270e−05 | c11: | 1.915e−08 | c12: | −2.997e−08 |
| | c13: | −1.069e−07 | c19: | −5.913e−10 | c20: | 1.595e−09 |
| | c21: | −2.667e−09 | c22: | −9.354e−11 | c23: | 5.040e−11 |
| | c24: | −1.389e−11 | c25: | 1.243e−11 | | |
| R3 | dY | −59.41 | dZ | 35.27 | Tilt | −4.71 |
| | r: | −422.096 | | | | |
| | c4: | −5.343e−04 | c5: | −3.223e−04 | c9: | −2.774e−07 |
| | c10: | −1.048e−06 | c11: | 1.571e−08 | c12: | 2.179e−09 |
| | c13: | −2.544e−09 | c19: | −2.343e−11 | c20: | 1.393e−11 |
| | c21: | 2.420e−10 | c22: | −5.189e−12 | c23: | 8.830e−15 |
| | c24: | 1.410e−13 | c25: | −2.157e−13 | | |
| R4 | dY | 13.41 | dZ | 48.60 | Tilt | 50.19 |
| | r: | −111.388 | | | | |
| | c4: | 1.563e−02 | c5: | −5.977e−03 | c9: | 1.714e−04 |
| | c10: | −6.736e−04 | c11: | −2.029e−05 | c12: | 4.581e−06 |
| | c13: | 4.807e−06 | c19: | −1.172e−07 | c20: | −1.973e−07 |
| | c21: | −1.942e−09 | c22: | 0.000e+00 | c23: | 0.000e+00 |
| | c24: | 0.000e+00 | c25: | 0.000e+00 | | |
| R5 | dY | 21.54 | dZ | 43.49 | Tilt | 49.00 |
| | r: | ∞ | d: | 0.80 | n: | 1.4917 | v: | 57.0 |
| R6 | r: | ∞ | d: | 0.20 | | | | |
| R7 | r: | ∞ | d: | 0.20 | n: | 1.4850 | v: | 55.0 |
| R8 | r: | ∞ | d: | 1.10 | n: | 1.5160 | v: | 55.0 |
| R9 | r: | ∞ | d: | 0.00 | | | | |

Figure 4:
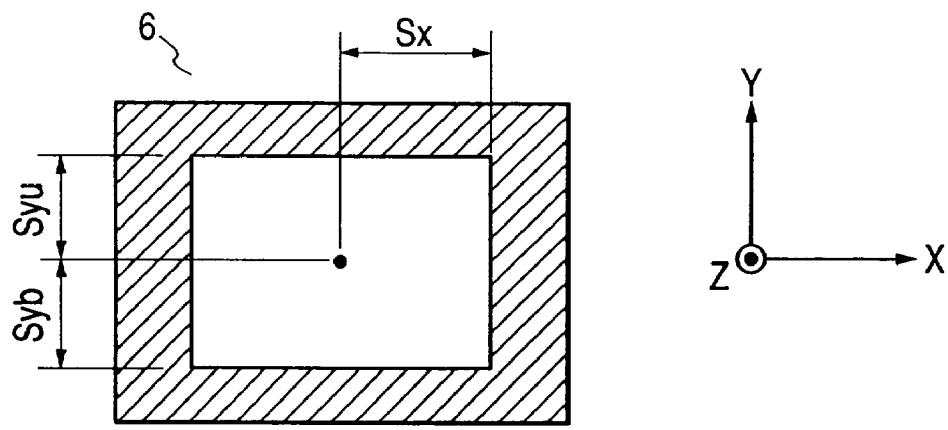
FIG. 4 is a front view of field stop 6 as a view from the Z-axis direction.
Figure 5:
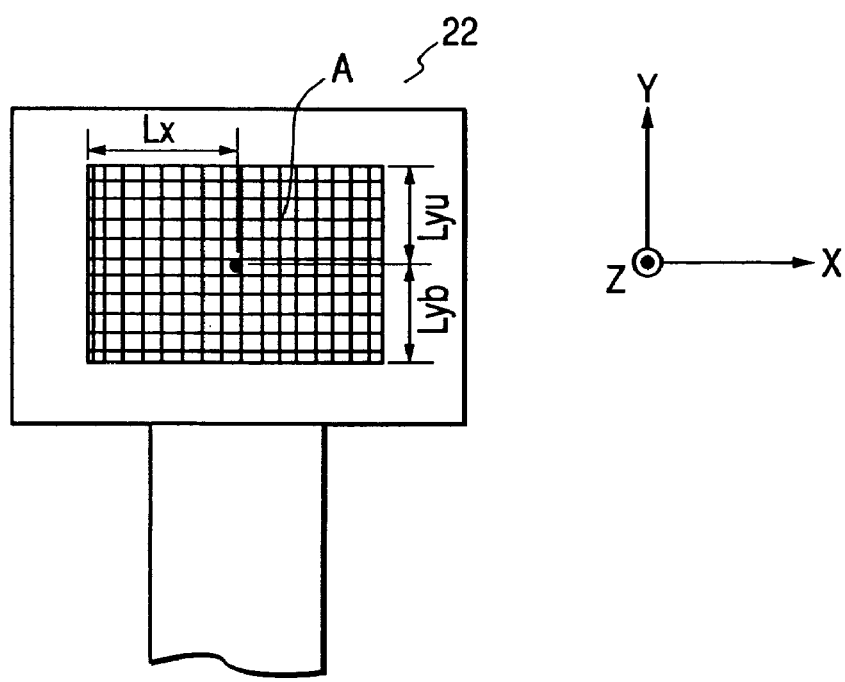
FIG. 5 is a front view of liquid crystal element 22 as a view from the Z-axis direction.

In this example, the liquid crystal element 22 is one having a diagonal length of the image display area A of 0.6 inch and the aspect ratio of 4:3. An aperture section of the field stop 6 and an effective section of the liquid crystal element 22 (the image display area A) are illustrated in FIG. 4 and FIG. 5. The field stop 6 is placed on the fifth surface (R5) being the surface S, and lengths of the respective edges of the aperture in the X-direction (the horizontal direction) and in the Y-direction (the vertical direction) with respect to the reference at the origin on the surface S, as illustrated in FIG. 4, are set as follows.

$Sx=6.63$ $Syu=4.93$ $Syb=5.03$

The liquid crystal element 22 is placed so that the screen cancer is located on the normal to the origin of the surface S, and distances from the center to the edges of the image display area A extending in the X-direction and in the Y-direction, as illustrated in FIG. 5, are set as follows.

$Lx=6.10$ $Lyu=Lyb=4.57$

Figure 6:
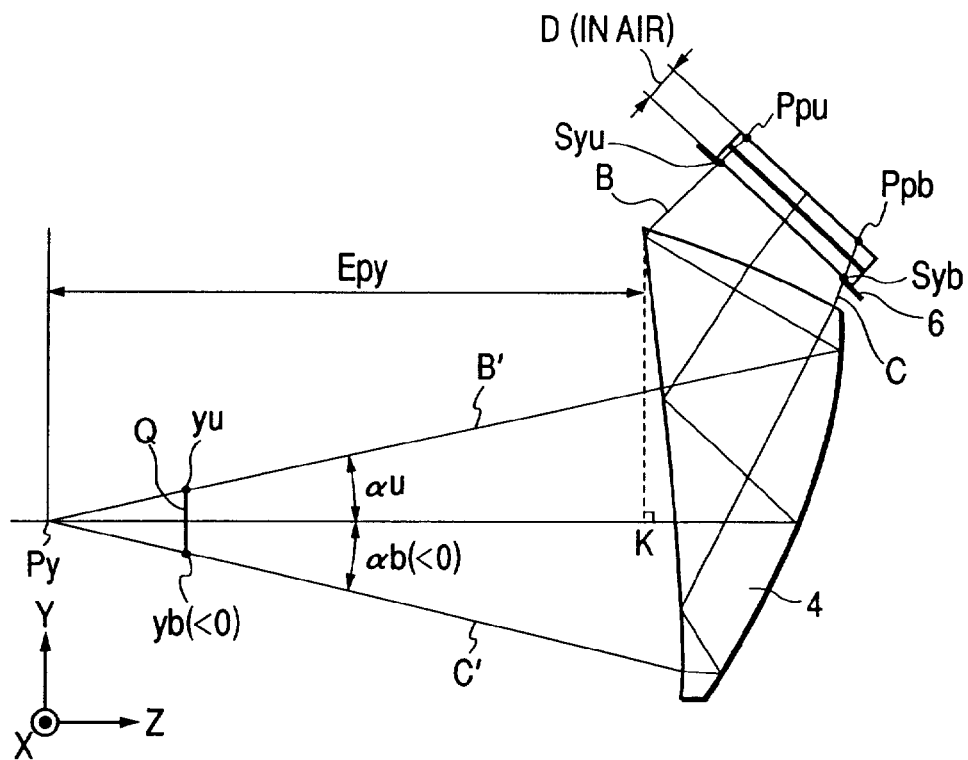
FIG. 6 is an explanatory diagram of optical paths for explaining variables in condition equations.

When the rays B, C passing the edges Syu, Syb of the field stop 6 and the edges Ppu, Ppb of the image display area A shown in FIG. 6 are obtained by ray tracing from the lens data, coordinates and angles of the rays B', C' on the set reference plane Q are as follows.
Ray B':

$(xu, yu, zu)=(0, 2, 0), \alpha u=11.65°$

Ray C':

$(xb, yb, zb)=(0, -2, 0), \alpha b=11.68°$

When the position is obtained for the intersecting point Py of the two rays from the above data, it is at the position of 9.69 mm from the set reference plane Q. The distance from the set reference plane Q to the prism body 4 is a distance from the set reference plane Q to a point K of a normal line on the reference optical axis from a point where the ray B is totally reflected by the second optical action surface, which is 33.03 mm. From the above, the distance Epy from the field limit point Py to the prism body is obtained as follows.

$Epy=42.72$

The vertical (Y-directional) length Ly of the image display area A is calculated as follows.

$Ly=Lyu+Lyb=9.14.$

Therefore, the following relation holds.

$Epy/Ly=4.67<3.5$

Figure 7:
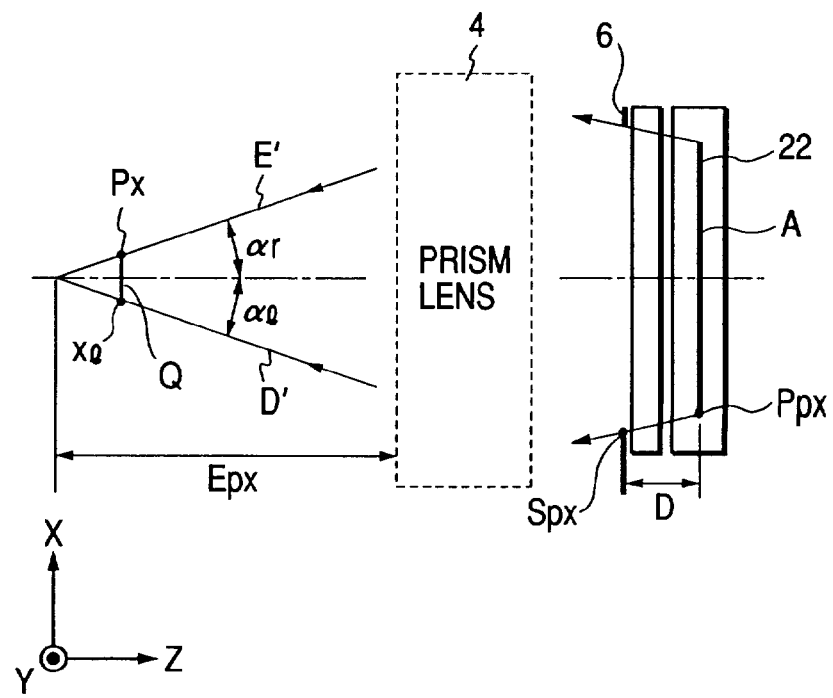
FIG. 7 is an explanatory diagram of optical paths in a cross section perpendicular to FIG. 6, for explaining variables in condition equations.

Now, let us obtain the field limit point in the horizontal direction (the X-direction) for the viewer's eye E. In order to explain how to obtain the field limit point in the X-direction, FIG. 7 shows the structure of the image viewing apparatus viewed from the Y-direction and the general diagram of rays passing from the liquid crystal element 22 through the field stop 6.

In this example the shapes of the free curved surfaces are symmetric in the horizontal direction (in the X-direction) with respect to the YZ plane and the liquid crystal element and field stop are also symmetric in the horizontal direction. Therefore, by ray tracing for one edge, similar to that in the vertical direction, we obtain the following data as coordinates and an angle on the set reference plane Q of a ray D' passing the edge Spx of the field stop 6 and the edge Ppx of the image display area A.

$(x1, y1, z1)=(3.5, 0, 0) \; \alpha 1=15.13°$

When the position is obtained for an intersecting point between this ray D' and a ray E' symmetric therewith, the position is 12.94 mm from the set reference plane Q. From the above, the distance Epx from the horizontal field limit point Px to the prism body 4 is calculated as follows.

$Epx=12.94+33.03=45.97$

Therefore, the following relation holds.

$Epx/Epy=1.08<1$

The horizontal viewing angle (field limit angle) αh in this example is obtained as follows.

$\alpha h=\alpha 1+\alpha r=2\alpha 1=30.26<23°$

Therefore, the image can be reproduced with presence.
When the number of pixels of this liquid crystal element is VGA-compatible 640×480, the number of pixels in the field of 1°×1° is as follows in the X-directional and Y-directional field.

$(640\times 1/30.26)\times(480\times 1/23.33)=435>100$

Therefore, a high-definition image can be obtained.

Incidentally, generally in an observation system, when a half field angle of a visual field is α and an image height is L, the focal length f is expressed by:

$$f = L/\tan\alpha,$$

and the diopter is expressed by:

$$1 \text{ diopter} = f^2/1000$$

It is preferable to set a position of the field stop 6 within a distance of 4 diopter from the surface of the liquid crystal element 22 which is a focal plane so as not to make blur in the edge portion of the field stop 6 stand out. Namely, when an air-reduced distance between the field stop 6 and the surface of the liquid crystal element 22 is D, it is preferable to satisfy the following condition.

$$D < 4 \text{ diopter}$$

$$D < 4 \ (f^2/1000)$$

Therefore, in this embodiment, since the focal length is expressed by:

$$f = (Ly/2)\tan\alpha y,$$

the structure of each element is preferably so determined as to satisfy the condition of:

$$D < (4((Ly/2)/\tan \alpha y)^2)/1000,$$

which is $$D(\tan^2 \alpha y)/Ly^2 < 1/1000.$$

Next, an air-reduced distance D from the field stop 6 to the surface of the liquid crystal element 22 is obtained as follows.

$$D = 1.60$$

Therefore, the following relation holds.

$$D(\tan^2 \alpha y)/Ly^2 = 0.00082 < 1/1000$$

$$\alpha y = (\alpha u - \alpha 1)/2$$

As described above, by properly setting the layout of the rays from the edges of the image display area A, the opening edges of the field stop 6, and the prism body 4, the rays are limited within such a range that unsharpness at the edges of the field stop 6 causes no trouble in viewing of the original image (the image display area A) displayed on the liquid crystal display device 2, whereby a good image can be viewed in the wide viewing field.

Numerical Example 2

The numerical example described below is an example in which the liquid crystal element 22 is one having the diagonal length of the image display area of 0.7 inch, the aspect ratio of 4:3, and the number of pixels if 800×200, and the data setting method and the expression of the free curved surfaces are the same as in Numerical Example 1 described above. Further, the sectional shapes are almost similar to those of FIG. 6 except for the detailed shape of each optical action surface.

Numerical data

Index of prism lens n: 1.53, Abbe Number ν: 55.0

| R1 | dY | −59.18 | dZ | 35.25 | Tilt | −4.76 |
|---|---|---|---|---|---|---|
| | r: | −427.279 | | | | |
| | c4: | −6342#−04 | c5: | 3.331e−04 | c9: | −9.043e−07 |
| | c10: | −1.918e−06 | c11: | 2.241e−08 | c12: | 5.284e−09 |
| | c13: | −3.781e−09 | c19: | −1.883e−11 | c20: | −1.225e−11 |
| | c21: | 5.306e−10 | c22: | −2.786e−13 | c23: | −6.612e−14 |
| | c24: | 8.024e−14 | c25: | −2.185e−13 | | |
| R2 | dY | −4.44 | dZ | 42.23 | Tilt | −25.53 |
| | r: | −65.463 | | | | |
| | c4: | −9.313e−04 | c5: | −8.308e−04 | c9: | 1.954e−06 |
| | c10: | −8.898e−06 | c11: | 1.787e−08 | c12: | −4.72Ce−08 |
| | c13: | −1.090e−07 | c19: | 1.302e−09 | c20: | −6.072e−11 |
| | c21: | 4.017e−10 | c22: | −7.700e−11 | c23: | 1.375e−11 |
| | c24: | 3.612e−11 | c25: | −6.411e−12 | | |
| R3 | dY | −59.18 | dZ | 35.25 | Tilt | −4.76 |
| | r: | −427.279 | | | | |
| | c4: | −6#342e−04 | c5: | −3.331e−04 | c9: | −9.043e−07 |
| | c10: | −1.918e−06 | c11: | 2.241e−08 | c12: | 5.284e−09 |
| | c13: | −3.781e−09 | c19: | −1.883e−11 | c20: | −1.225e−11 |
| | c21: | 5.306e−10 | c22: | −2.786e−13 | c23: | −6.812e−14 |
| | c24: | 8.024e−14 | c25: | −2.185e−13 | | |
| R4 | dY | 14.44 | dZ | 49.28 | Tilt | 52.23 |
| | r: | −98.094 | | | | |
| | c4: | 1.677e−02 | c5: | −4.805e−03 | c9: | 2.364e−04 |
| | c10: | −8.932e−04 | c11: | −3.571e−05 | c12: | 1.095e−05 |
| | c13: | 1.871e−06 | c19: | −4.062e−08 | c20: | −3.891e−07 |
| | c21: | 4.004e−08 | c22: | 0.000e+00 | c23: | 0.000e+00 |
| | c24: | 0.000e+00 | c25: | 0.000e+00 | | |
| R5 | dY | 21.83 | dZ | 43.30 | Tilt | 49.00 |
| | r: | ∞ | d: | 0.80 | n: | 1.4917 | v: | 57.0 |
| R6 | r: | ∞ | d: | 0.20 | | | | |
| R7 | r: | ∞ | d: | 0.20 | n: | 1.4850 | v: | 55.0 |
| R8 | r: | ∞ | d: | 1.10 | n: | 1.5160 | v: | 55.0 |
| R9 | r: | ∞ | d: | 0.00 | | | | |

The shape of the field stop in this example is defined as follows.

$$Sx = 7.69$$

$$Syu = 5.69$$

$$Syb = 5.81$$

The distances to the edges of the screen of the liquid crystal element are as follows.

$$Lx = 7.11$$

$$Lyu = Lyb = 5.33$$

Various quantities of the condition equations, similar to Numerical Example 1, are obtained as follows by ray tracing using the above data.

$$xu = 0, \ yu = 2, \ \alpha u = 13.24°$$

$$xb = 0, \ yb = -2, \ \alpha b = <13.22°$$

The distance from the set reference plane to the prism lens=32.83.

The distance from the set reference plane to the field limit point=8.51

$$Epy = 41.34$$

$$Ly = Ly1 + Ly2 = 10.66$$

$$Epy/Ly = 3.87 > 3.5$$

x1=3.5, y1=0, α1=17.5°

Epx=43.93

Epx/Epy=1.06>1

α1+αr=2αl=35>23°

(800×1/35)×(200×1/26.46)=186>100

D=1.60

$D(\tan^2 \alpha y)/Ly^2 = 0.00078 < 1/1000$

αy=(αu−αl)/2

As described above, the image viewing apparatus permitting the viewing of image information in a wide viewing field and with good image quality while accomplishing the downsizing of the whole apparatus can be achieved by properly setting the structure of the optical system for guiding the light from the display means to the viewer's eye, for example the structure of the optical means etc. comprised of the display means and the prism body having the refracting action, in viewing the image information displayed on the display means such as the liquid crystal display or the like, in the wide variety field.

Particularly, the liquid crystal element to display the image can be scaled down so as to be able to provide the head-mounted display capable of assuring a sufficient viewing area while scaling down the viewing optical system and permitting the viewer to enjoy the high-definition image with presence.

What is claimed is:

1. An image viewing apparatus comprising:
    a stop for limiting light from an original image; and
    a viewing optical system for guiding the light from the original image, limited by said stop, to the eye of a viewer, said viewing optical system comprising an optical element of a transparent optical material, wherein said optical element comprises a prism body having an entrance surface into which the light from the original image is incident, a reflecting surface for reflecting the light incident into said entrance surface, and an exit surface from which the light reflected by said reflecting surface is emergent and wherein at least one of said entrance surface, reflecting surface, and exit surface is a curved surface, said curved surface being a rotationally asymmetric, aspherical surface,
    wherein the following condition is satisfied:

3.5<Epy/Ly where a reference optical axis is defined by a ray emitted from the center of the optical image and passing the center of the pupil of the viewer via said viewing optical system, Ly is a width of the original image in an extending direction of an intersecting line of a plane including the reference optical axis and a plane including the original image, and Epy is a distance from said prism body to an intersecting point on the viewer side, wherein the intersecting point is a point of intersecting of two rays (i) emitted from two edges of the original image in the extending direction of the intersecting line, (ii) passing edges of an aperture of said stop corresponding to the respective edges of the original image, and (iii) passing through said viewing optical system.

2. The image viewing apparatus according to claim 1, wherein the following condition is satisfied:

1<Epx/Epy where Epx is a distance from an intersecting point, on the view side, of two rays (i) emitted from two edges of the original image in a direction perpendicular to the intersecting line, (ii) passing edges of the aperture of said stop corresponding to the respective edges of the original image, and (iii) passing through said viewing optical system, to said prism body.

3. The image viewing apparatus according to claim 1, wherein the following condition is satisfied:

23°<αh where αh is an angle at a point of intersection on the viewer side between two rays (i) emitted from two edges of the original image in a direction perpendicular to the intersecting line, (ii) passing edges of the aperture of said stop corresponding to the respective edges of the original image, and (iii) passing through the viewing optical system.

4. The image viewing apparatus according to claim 1, wherein the following condition is satisfied:

$D(\tan^2 \alpha y)/Ly^2 < 1/1000$ where

αy=(αu−αb)/2, where αu is an angle at a point of intersection on the viewer side between the reference optical axis and a ray (i) emitted from one edge of the original image in the extending direction of the intersecting line, (ii) passing an edge of the aperture of said stop corresponding thereto, and (iii) passing through said viewing optical system, αb is an angle at a point of intersection on the viewer side between the reference optical axis and a ray emitted from another edge of the original image in the extending direction of the intersecting line and passing an edge of the aperture of said stop corresponding thereto, and D is an air-reduced amount between said stop and the original image.

5. The image viewing apparatus according to claim 1, wherein said prism body comprises:
    a first optical action surface as said entrance surface;
    a second optical action surface as said exit surface; and
    a third optical action surface as said reflecting surface,
    wherein the light from the original image successively travels into said first optical action surface, is totally reflected by said second optical action surface, is reflected by said third optical action surface, and travels out of said second optical action surface.

6. An image viewing apparatus comprising:
    a stop for limiting light from an original image; and
    a viewing optical system for guiding the light from the original image, limited by said stop, to the eye of a viewer, said viewing optical system comprising an optical element of a transparent optical material, wherein said optical element comprises a prism body having an entrance surface into which the light from the original image is incident, a reflecting surface for reflecting the light incident into said entrance surface, and an exit surface from which the light reflected by said reflecting surface is emergent and wherein at least one of said entrance surface, reflecting surface, and exit surface is a curved surface, said curved surface being a rotationally asymmetric, aspherical surface, wherein the following condition is satisfied:

$$1 < Epx/Epy$$

where a reference optical axis is defined by a ray emitted from the center of the optical image and passing the center of the pupil of the viewer via said viewing optical system, Epy is a distance to said prism body from an intersecting point on the viewer side, wherein the intersecting point is a point of intersection of two rays (i) emitted from two edges of the original image in an extending direction of an intersecting line of a plane including the reference optical axis and a plane including the original image, (ii) passing edges of an aperture of said stop corresponding to the respective edges of the original image, and (iii) passing through said viewing optical system, and Epx is a distance to said prism body from an intersecting point, on the viewer side, of two rays (i) emitted from two edges of the original image in a direction perpendicular to the intersecting line, (ii) passing edges of the aperture of said stop corresponding to the respective edges of the original image, and (iii) passing through said viewing optical system.

7. An image viewing apparatus comprising:

a stop for limiting light from an original image; and a viewing optical system for guiding the light from the original image, limited by said stop, to the eye of a viewer, said viewing optical system comprising an optical element of a transparent optical material, wherein said optical element comprises a prism body having an entrance surface into which the light from the original image is incident, a reflecting surface for reflecting the light incident into said entrance surface, and an exit surface from which the light reflected by said reflecting surface is emergent and wherein at least one of said entrance surface, reflecting surface, and exit surface is a curved surface, said curved surface being a rotationally asymmetric, aspherical surface, wherein the following condition is satisfied:

$$23° < \alpha h$$

where a reference optical axis is defined by a ray normally emitted from the center of the original image and passing the center of the pupil of the viewer via said viewing optical system, and $\alpha h$ is an angle at a point of intersection on the viewer side between two rays (i) emitted from two edges of the original image in a direction perpendicular to an intersecting line of a plane including the reference optical axis and a plane including the original image, (ii) passing edges of an aperture of said stop corresponding to the respective edges of the original image, and (iii) passing through said viewing optical system.

8. An image viewing apparatus comprising:

a stop for limiting light from an original image; and a viewing optical system for guiding the light from the original image, limited by said stop, to the eye of a viewer, said viewing optical system comprising an optical element of a transparent optical material, wherein said optical element comprises a prism body having an entrance surface into which the light from the original image is incident, a reflecting surface for reflecting the light incident into said entrance surface, and an exit surface from which the light reflected by said reflecting surface is emergent and wherein at least one of said entrance surface, reflecting surface, and exit surface is a curved surface, said curved surface being a rotationally asymmetric, aspherical surface, wherein the following condition is satisfied:

$$D(\tan^2 \alpha y)/Ly^2 < 1/1000$$

where $$\alpha y = (\alpha u - \alpha b)/2,$$

where a reference optical axis is defined by a ray emitted from the center of the original image and passing the center of the pupil of the viewer via said viewing optical system, Ly is a width of the original image in an extending direction of an intersecting line of a plane including the reference optical axis and a plane including the original image, $\alpha u$ is an angle at a point of intersection on the viewer side between the reference optical axis and a ray (i) emitted from one edge of the original image in the extending direction of the intersecting line, (ii) passing an edge of the aperture of said stop corresponding thereto, and (iii) passing through said viewing optical system, $\alpha b$ is an angle at a point of intersection on the viewer side between the reference optical axis and a ray emitted from another edge of the original image in the extending direction of the intersecting line and passing an edge of the aperture of said stop corresponding thereto, and D is an air-reduced amount between said stop and the original image.

* * * * *

UNITED STATES PATENT AND TRADEMARK OFFICE
CERTIFICATE OF CORRECTION

PATENT NO. : 6,310,728 B1
DATED : October 30, 2001
INVENTOR(S) : Atsushi Okuyama et al.

It is certified that error appears in the above-identified patent and that said Letters Patent is hereby corrected as shown below:

<u>Title page,</u>
Item [75], Inventors: "Ninomiya-machi," should read -- Yamanishi, --.
Item [56], References Cited, U.S. PATENT DOCUMENTS, "Kayama et al." should read -- Koyama et al. --.
FOREIGN PATENT DOCUMENTS, "6-43389" should read -- 5-43389 --.
OTHER PUBLICATIONS, "p pp. 70-75" should read -- pp. 70-75 --.

<u>Column 2,</u>
Line 59, "said" should read -- the --.

<u>Column 6,</u>
Line 12, "follows;" should read -- follows: --.

<u>Column 7,</u>
Line 44, "cancer" should read -- center --.

<u>Column 8,</u>
Line 52, "1.08<1" should read -- 1.08>1 --.
Line 57, "30.26<23°" should read -- 30.26>23° --.
Line 63, "field." should read -- fields. --.

<u>Column 10,</u>
Line 8, "-6342#-04" should read -- 6.342e-04 --.
Line 18, "-6#342e-04" should read -- 6.342e-04 --.

Signed and Sealed this

Tenth Day of September, 2002

*Attest:*

*Attesting Officer*

JAMES E. ROGAN
*Director of the United States Patent and Trademark Office*